United States Patent [19]
Ziegler

[11] Patent Number: 5,239,339
[45] Date of Patent: * Aug. 24, 1993

[54] ALIGNMENT TECHNIQUE FOR A PHOTOGRAPHIC ENLARGER

[76] Inventor: William R. Ziegler, 417 Shirley Way, Menlo Park, Calif. 94025

[*] Notice: The portion of the term of this patent subsequent to Aug. 21, 2007 has been disclaimed.

[21] Appl. No.: 751,726

[22] Filed: Aug. 29, 1991

Related U.S. Application Data

[63] Continuation-in-part of Ser. No. 510,436, Apr. 18, 1990, Pat. No. 5,057,862, which is a continuation of Ser. No. 228,991, Aug. 5, 1988, Pat. No. 4,951,087.

[51] Int. Cl.⁵ ............................................. G03B 27/52
[52] U.S. Cl. ....................................... 355/43; 355/72; 355/77
[58] Field of Search ...................... 355/18, 43, 45, 56, 355/72, 75, 77; 354/189

[56] References Cited

U.S. PATENT DOCUMENTS

| | | | |
|---|---|---|---|
| 2,701,501 | 2/1955 | Cuny | 356/153 |
| 3,432,233 | 3/1969 | Kauffman | 355/72 |
| 3,825,938 | 7/1974 | Koch | 354/160 |
| 4,264,165 | 4/1981 | Beauviala et al. | 354/474 |
| 4,733,257 | 3/1988 | Ziegler | 354/189 |
| 4,951,087 | 8/1990 | Ziegler | 355/43 |
| 5,057,862 | 10/1991 | Ziegler | 355/43 |

Primary Examiner—D. Rutledge
Attorney, Agent, or Firm—Heller, Ehrman, White & McAuliffe

[57] ABSTRACT

An alignment arrangement for photographic recording apparatus having a lens plane, an object plane, and an image plane. The alignment arrangement comprises an alignment module including a mirror, and luminous indicia disposed in a plane parallel to the mirror's reflective surface. The alignment module may be mounted on the apparatus so that the mirror's reflective surface lies parallel to one of the planes of the apparatus. A second mirror may be placed in another plane of the apparatus so that its reflective surface is parallel to that plane. The alignment module includes a viewing system which allows the two mirrors to be simultaneously viewed. Multiple images of the indicia, created by the two mirrors, may be observed. The images assume only one of many different patterns when the reflective surfaces of the two mirrors are parallel.

33 Claims, 9 Drawing Sheets

ALIGNMENT TECHNIQUE FOR A PHOTOGRAPHIC ENLARGER

The present application is a continuation-in-part of application Ser. No. 07/510,436, filed Apr. 18, 1990, now U.S. Pat. No. 5,057,862, which is a continuation of application Ser. No. 07/228,991, filed Aug. 5, 1988 and now issued as U.S. Pat. No. 4,951,087 on Aug. 21, 1990.

BACKGROUND OF THE INVENTION

The present invention relates generally to alignment techniques for photographic equipment and more particularly to an alignment technique for use with a photographic enlarger apparatus.

The present invention is an extension of the principles relied upon in Applicant's U.S. Pat. No. 4,733,257, which is incorporated herein by reference. In that patent a technique for aligning (making parallel) the lens and the film planes of a view camera is disclosed. That technique uses a pair of mirror members, each having a mirror body including its own mirrored surface. A first one of the mirror members is confined to fit within the film standard of the view camera in lieu of a film holder so that its mirrored surface faces the lens standard of the camera and coincides or substantially coincides with the camera's film plane. The second mirror member is configured to replace temporarily the camera's lens and lens board which is within its lens standard so that the second mirrored surface faces the film standard and first mirrored surface and coincides with the camera's lens plane. In addition the second mirror member includes a view hole through its mirror body and mirrored surfaces so that the two mirrored surfaces can be viewed from outside the lens standard. At the same time, certain specific indicia is provided on at least one of the mirrored surfaces such that when the mirrored surfaces are viewed through the view-hole of the second mirror member from outside the lens standard, the indicia will take only one of many different forms if the two mirrored surfaces are parallel. In this way, as the indicia is viewed, the lens and film standards can be adjusted to cause the indicia to take on the one particular form, thereby insuring that the mirrored surfaces, and therefore the lens and film planes are indeed parallel.

Applicant has found it not only important to align view cameras in the manner described in his U.S. Pat. No. 4,733,257, but he has also found it to be quite important to align accurately (make parallel) certain planes of enlarger apparatus. More specifically the photographic enlarger apparatus includes an enlarger head assembly, means for supporting the photographic paper and means for supporting the enlarger head assembly.

Typically the means for supporting the photographic paper is an easel, and the enlarger assembly is supported above the plane of the easel. The photographic paper lies on the easel, and as such, the plane of the photographic paper is in the plane of the easel. In circumstances where very large prints must be made, it is not uncommon to dispense with the easel, and then support the photographic paper in a plane some distance from the enlarger head assembly. For example, the enlarger head assembly may be supported on a table, with the photographic paper supported on the floor below the enlarger head assembly. The paper may also be supported on a wall with the enlarger assembly mounted horizontally in alignment with the photographic paper.

Low light conditions may also present problems in operating an alignment apparatus for a photographic enlarger. This would occur, for example, if the alignment apparatus was used in a darkroom illuminated only by a photographic safelight.

In view of the foregoing it is an object of the present invention to provide an accurate and reliable alignment technique to check the parallel relationship between the lens and/or negative planes of a camera assembly forming part of an overall photographic enlarger apparatus and the plane of an easel which is intended to support photographic paper.

Another object of the present invention is to provide an alignment technique of the last mentioned type which is also uncomplicated and economical, and can be readily incorporated into an existing photographic enlarger apparatus.

Still another object of this invention is to provide an alignment technique that does not require making any modifications to an existing photographic enlarger apparatus, but rather uses existing components that are compatible with the apparatus.

A further object of the present invention is to provide an arrangement for adjusting the plane of the easel forming part of the last mentioned photographic enlarger apparatus in order to make the plane parallel with the lens and/or negative planes of the camera assembly.

Another object of the present invention is to provide an alignment technique which may be used independent of the orientation of the photographic enlarger apparatus.

Yet another object of the invention is to provide an alignment technique which may be used under low light conditions.

SUMMARY OF THE INVENTION

The present invention comprises an alignment arrangement for use in photographic reproduction apparatus such as a photographic enlarger. The photographic reproduction apparatus may have three principal planes including a lens plane defined by a lens, an object plane defined by the object to be reproduced and an image plane defined by means for supporting photographic recording material. The alignment arrangement has means including a first mirror member having a mirror body and a mirrored surface, and a view-hole through the mirrored surface. The means are configured such that the mirrored surface of the first mirror member may be placed parallel to one of the principal planes of the photographic reproduction apparatus. The alignment arrangement further includes a second mirror member having a mirror body and a mirrored surface. The second mirror member is configured such that its mirrored surface may be placed parallel to another of the principal planes of the photographic reproduction apparatus. Viewing means are included to allow a viewer to simultaneously view both of the mirrored surfaces from a direction at an angle to a viewing axis substantially perpendicular to the mirrored surfaces. Luminous indicia are disposed relative to the first and second mirror members such that a plurality of images of the luminous indicia is visible when the mirrored surfaces are simultaneously viewed. The alignment of the principal planes including the first and second mirror members may be adjusted while the mirrored surfaces are being simultaneously viewed. When the mirrored surfaces are parallel the plurality of images takes on only one of many different forms. When that one of many different forms is observed, the principal planes may be assumed to be parallel.

When four luminous indicia are located at the corners of a square and symmetrically disposed about the viewing axis the one pattern indicating parallelism appears to be two straight lines of images of the luminous indicia, and the straight lines appear to intersect at the center of a dot.

The means including the first mirror member, the viewing means, and the luminous indicia may be incorporated in an alignment module. The alignment module may be mounted on the photographic reproduction apparatus in any orientation.

DESCRIPTION OF THE DRAWINGS

The various inventive aspects of the present application will be discussed in conjunction with the drawings, wherein.

DETAILED DESCRIPTION OF THE INVENTION

Figure 1:
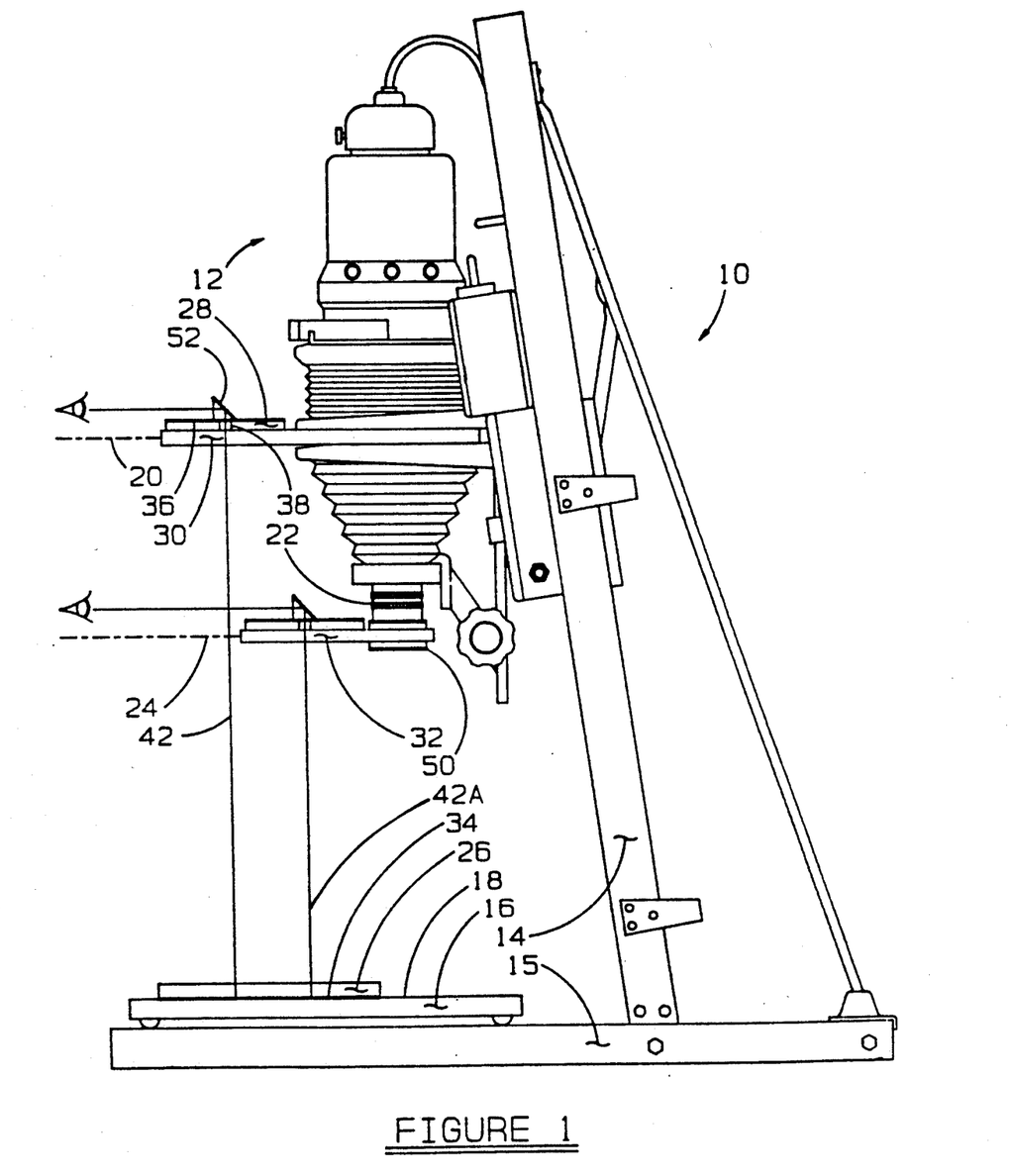
FIG. 1 is an enlarged side elevational view of a photograph enlarger apparatus and an alignment arrangement in combination therewith.

Turning now to the drawings, wherein like components are designated by like reference numbers throughout the various figures, attention is first directed to FIG. 1. This figure illustrates a photographic enlarger apparatus 12 of the conventional type, for example, one manufactured by Omega under the trade name D5. As seen in FIG. 1, this enlarger includes an enlarger head assembly 12 supported on an upright or stand 14 directly above a baseboard 15 which supports an easel 16 having a horizontally extending, upwardly facing easel surface 18. The enlarger head assembly 12 includes, among other components, a removable frame for supporting a negative to be enlarged within what will be referred to as a negative plane. In FIG. 1, the negative support frame is not shown as it has been removed from the enlarger head assembly. However, the negative plane is illustrated by dotted lines at 20. The enlarger head assembly 12 also includes a lens 22 defining a lens plane 24 indicated by dotted lines in FIG. 1. In order to insure that apparatus 10 makes high quality enlargements, it is important that negative plane 20 and lens plane 24 be truly parallel with easel surface 18. In accordance with one embodiment of the present invention, an arrangement of mirror members and mirror member supports is used to achieve this end.

More specifically, as will be described in detail hereinafter, one particular embodiment of this alignment arrangement includes a first mirror member 26, a second mirror member 28, a plate 30 for supporting mirror member 28 in or parallel to negative plane 20, and a plate 32 for supporting mirror member 28 in lens plane 24.

Figure 2A:
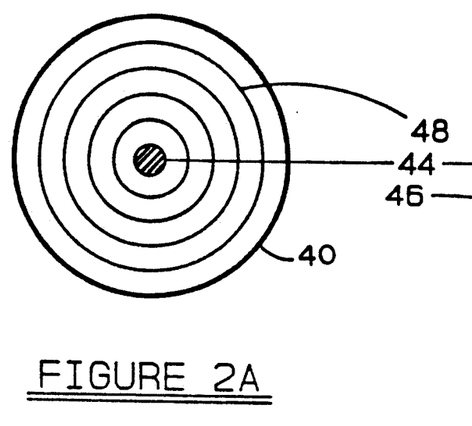
FIGS. 2A and 2B diagrammatically illustrate the way in which the alignment arrangement of FIGURE 1 operates.
Figure 2B:
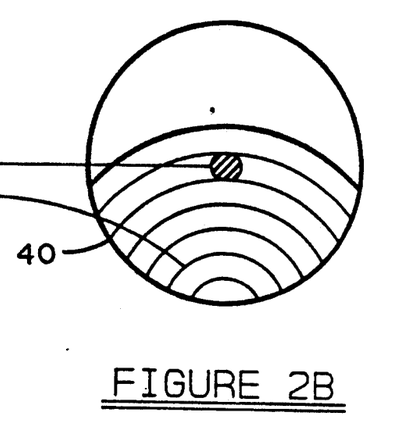

As best illustrated in FIG. 1, mirror member 26 comprises a mirror body having flat mirrored surface 34. This mirror member is placed on easel 16 so that mirrored surface 34 faces upward under the enlarger head assembly. At the same time, plate 30 which is, for example, a clear glass plate or other such transparent support member, is disposed within the space vacated by the negative support frame of the enlarger head and therefore extends in negative plane 20. This transparent plate 30 supports mirror member 28 on its top surface, directly over and in vertical alignment with mirror member 26. Mirror member 28 has a mirror body including a downwardly facing mirrored surface 36 and a view hole 38 through its mirror body and mirrored surface. While not shown, a circle is located on mirror member 28 concentrically around view hole 38 as in the corresponding mirror in U.S. Pat. No. 4,733,257. With mirror members 26 and 28 in this positional relationship to one another, both mirrored surfaces can be viewed through view hole 38, above mirror member 28, as indicated by the view line 42. If easel surface 18 and negative plane 20 are truly parallel to one another, the view hole 38 of mirror member 28 will appear as a dot 44 in the center of a series of concentric circles 48, as illustrated in FIG. 2A. On the other hand, if easel surface 18 and negative plane 20 are not truly parallel, circle 40 will appear as a series of arcs 46 as illustrated in FIG. 2B. Thus, if easel surface 18 and negative plane 20 are not truly parallel, as observed through view hole 38, it is only necessary to adjust negative plane 20 and/or easel surface 18 until concentric circles 48 appear around dot 44. This procedure is discussed in more detail in U.S. Pat. No. 4,733,257 which, as indicated above, is incorporated herein by reference.

Negative plane 20 can be adjusted in any suitable and readily providable manner, depending on the particular enlarger. It may also be possible to, adjust the entire enlarger head assembly 12 and support upright 14 relative to easel surface 18 by means of shims or the like. As will be seen hereinafter in conjunction with FIGS. 7-9, an assembly is provided for adjusting the easel itself.

The discussion immediately above related to the way in which negative plane 20 is made parallel with easel surface 18. Mirror member 28 may also be supported on plate 32 directly over mirror member 26 in order to make lens plane 24 parallel with the easel surface. To this end, plate member 32 is also transparent, for example a clear glass plate, and, as indicated above, it is supported in lens plane 24. Means generally indicated at 50 is provided for connecting plate member 32 to lens 22 of enlarger head assembly 12 in a manner to be described below.

From the foregoing, it should be apparent that the same mirror member 28 can be moved between plates 30 and 32 and the mirror member 26 can be large enough to cover both view lines 42 and 42a in order to align negative and lens planes 20 and 24, respectively, with easel surface 18. In both cases, because enlarger head assembly 12 is located a relatively large distance above easel 16, it may be difficult for the observer to position himself directly over plates 30 and 32. Accordingly, the overall alignment arrangement may include a prism 52 or small mirror set at an angle which can be placed on mirror member 28 directly over view hole 38. As a result, the observer can look down through the view hole and along viewing line 42 from one side of the prism, as illustrated in FIG. 1. In this way, the observer does not have to position himself directly over mirror member 28.

Figure 3:
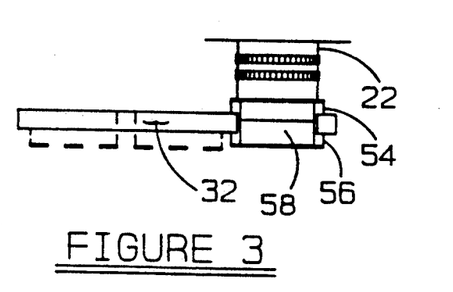
FIG. 3 is an enlarged side elevational view of part of the enlarger apparatus and alignment arrangement of FIG. 1.

As indicated above, means 50 is provided for connecting plate 32 to lens 22. FIG. 3 illustrates a pair of cooperating adaptor and filter retaining rings 54 and 56, respectively, serving as means 50. Adaptor ring 54 connects directly to the lens in a known manner, and filter retaining ring 56 connects to the adaptor ring through a cooperating opening 58 in plate 22. Using standard, commercially available adaptor and filter rings, for example, Tiffen rings, such rings can only accommodate a 1/16" thick glass plate 32. However, the filter ring can be readily customized to accommodate a ⅛" thick glass plate.

Figure 4:
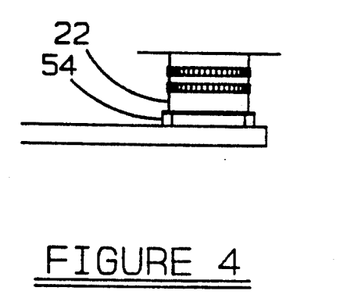
FIG. 4 is a view similar to FIG. 3, but showing a modified version of the components illustrated in FIG. 3.

FIG. 4 illustrates a modified version of connecting means 50. This version consists of adaptor ring 54 which is bonded to the top side of plate 32. In this way, the plate does not require a cooperating opening 58 and the connecting means does not include the filter retaining ring 56.

Figure 5:
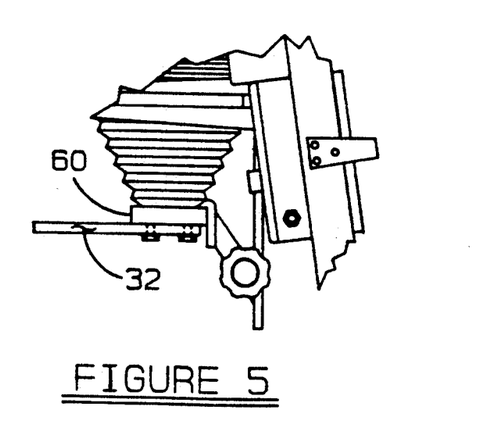
FIG. 5 is a view similar to FIGS. 3 and 4 showing still a further modified version of the components of FIG. 3.

FIG. 5 illustrates still another means for maintaining plate 32 in lens plane 24. In this version, the lens itself is removed and plate 32 is bolted or otherwise secured to the lens board 60 forming part of the overall enlarger head assembly. In this case, neither an adaptor ring nor a filter retaining ring is necessary and plate 32 can be thicker than ⅛" and does not have to include an opening 58.

Figure 6:
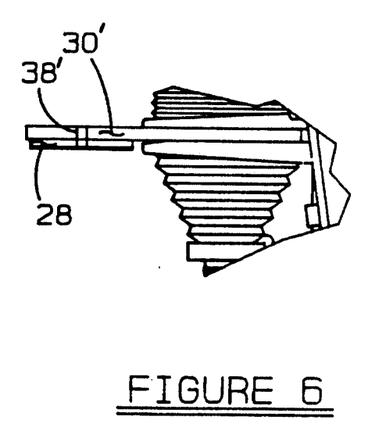
FIG. 6 is a side elevational view showing a further modification of the alignment arrangement of FIG. 1.

Both of these plates 30 and 32 forming part of the alignment arrangement discussed above were described as being constructed of transparent glass. It is possible to use opaque plates, for example stainless steel plates. In this case, a mirror member corresponding to member 28 would have to be connected, either fixedly or removably, to the underside of the plate, as illustrated by dotted lines in FIG. 3 (in the case of plate 32) and in FIG. 6 by solid lines (in the case of plate 30). In both cases, the plate would have to have an opening in alignment with the view hole. The opaque plate illustrated in FIG. 6 is indicated by reference number 30' to distinguish it from plate 30. This plate includes its own view hole 38'. The mirror member 28 could be fixedly bonded to the underside of plate 30', in which case a second mirror member would be required for a plate corresponding to plate 32. On the other hand, the mirror member 28 could be provided with a magnetic back surface or double side tape so that the mirror member could be removably connected to the underside of plate member 30'.

In addition to the foregoing, mirror member 28, whether on top of the supporting plate or attached to its underside, was described as including a circle concentrically disposed around view hole 38. As in Applicant's issued patent, it is to be understood that either the mirror member 26 or mirror member 28, or both, could include indicia such that when the mirrored surfaces are viewed through the view hole, the indicia will take on only one of many different forms if the two mirrored surface are parallel. In a preferred and actual working embodiment, a concentric circle around view hole 38 is used.

Figure 7:
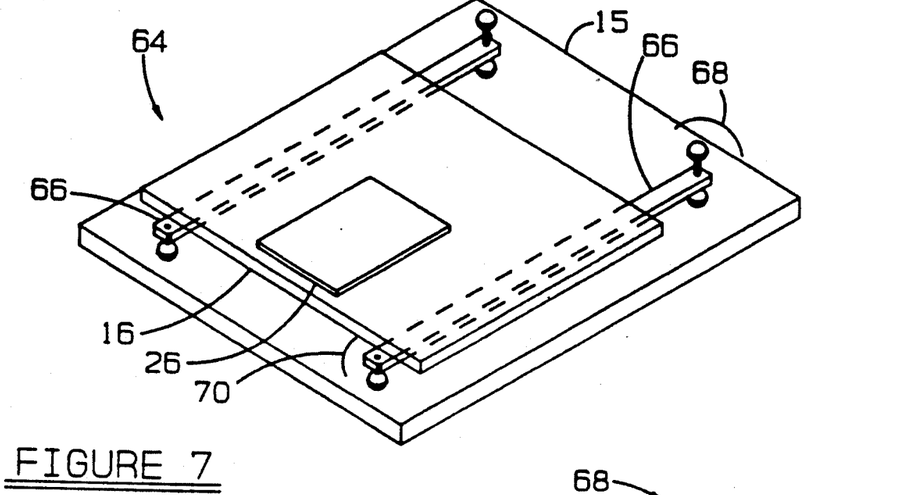
FIG. 7 is a prospective view of an easel alignment assembly designed in accordance with the present invention and serving as an additional alignment component of the alignment arrangement of FIG. 1.

As can be seen best in FIG. 1, in the embodiment shown there, easel 16 is supported directly onto baseboard 15. As a result, it is very difficult and, with most enlargers, impractical to adjust the easel itself or the baseboard in order to properly align easel plane 18 with negative plane 20 and/or lens plane 24. In order to make it possible to easily adjust the easel plane, the present invention provides for an overall easel adjustment assembly which is illustrated in FIG. 7 at 64. This arrangement includes a pair of rigid alignment bars 66, each of which includes position adjustment mechanisms 68 and 70 at opposite ends. These adjustment mechanisms will be described hereinafter. For the moment, it suffices to say that the adjust bars are intended to sit directly on baseboard 15 of enlarger apparatus 10 in spaced apart, parallel relationship to one another, as illustrated in FIGURE 7. These adjustment bars support easel 16 on their inwardly facing surfaces and the easel, in turn, supports mirror member 26, as in FIG. 1.

Figure 8:
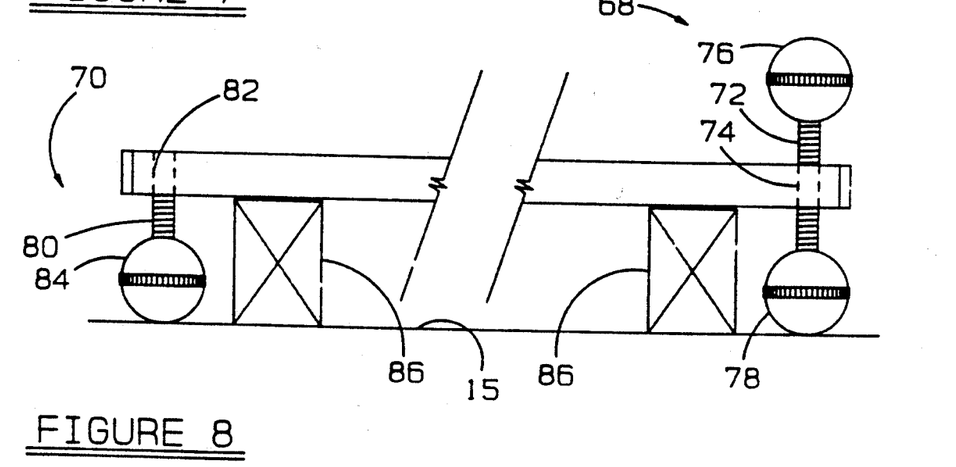
FIG. 8 is a side elevational view of one of two adjustment bars forming part of the easel adjustment assemble illustrated in FIG. 7.
Figure 9:
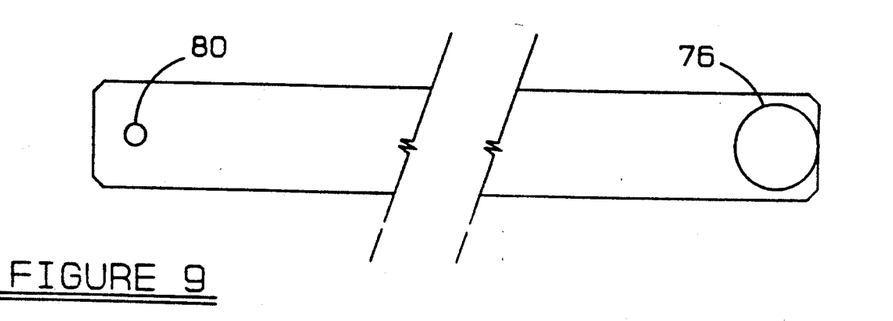
FIG. 9 is a top elevational view of the adjustment bar illustrated in FIG. 8.

Referring to FIGS. 8 and 9, one of the alignment bars is shown is side elevational view along with its adjustment mechanisms 68 and 70. As seen particularly in FIG. 8, the position adjustment mechanism 68 is comprised of a threaded shaft 72 which is thread mounted within a cooperating threaded opening 74 through one end of the alignment bar. Upper and lower adjustment knobs 76 and 78 are fixedly mounted to opposite ends of the threaded shaft 72. The adjustment mechanism 70 is similar to mechanism 68 to the extent that it includes a threaded shaft 80 disposed within a cooperating threaded opening 82 at the opposite end of the alignment bar and to the extent that it includes a bottom adjustment knob 84. However, as illustrated in FIG. 8, the threaded shaft 80 of adjustment mechanism 70 does not extend above the alignment bar, and it does not include an upper adjustment knob. Moreover, shaft 80 is fixed within its opening and knob 84 is thread mounted for vertical adjustment along shaft 80. Both alignment bars preferably include identical adjustment mechanisms 68 and 70.

With the two alignment bars supporting easel 16 and mirror member 26 on baseboard 15 in the manner shown, assuming that all of the lower adjustment knobs uniformly support the easel on the baseboard, it is merely a matter of selectively rotating specific knobs, either clockwise or counterclockwise, to selectively raise or lower specific ends or lengths of the alignment bars in order to adjust the position of the easel in the desired manner. By providing only two top knobs at common ends, an easel larger than the bars can extend over the other end.

In order to assure that all four lower adjustment knobs 78 and 80 do, indeed, uniformly support easel 16, the pair of support blocks 86 shown in dotted lines in FIG. 8 may be utilized to initially support the alignment bars in baseboard 15. As seen in FIG. 8, blocks 86 are equal in height and they are sufficiently large to initially support each alignment bar above baseboard 15 such that the lower knobs 78 and 74 do not touch the baseboard. Four such blocks would be provided, two for each alignment bar. They would be provided to initially support the two alignment bars in the position shown in FIG. 7 with the easel thereon and allow a single individual to make the necessary adjustments. Thereafter, the adjustment mechanisms 68 and 70 would be manipulated so that each of the lower adjustment knobs 78 and 84 below each alignment bar just touch baseboard 15. In this way, the blocks 86 can be removed so that the four lower adjustment knobs equally support easel 16 at the four corners defined by the ends of the alignment bars.

Once easel alignment assembly 64 is positioned on baseboard 15 in the manner described immediately above and is supporting easel 16 and mirror 26, the overall enlarger can be adjusted. Assuming the operator desires to align both the negative plane 20 and the lens plane 24, it is first necessary to make sure that these two planes are themselves parallel to one another, even if they are not initially parallel with the easel. This can be accomplished by utilizing the alignment arrangement described above. First, the two mirror members 26 and 28 would be used to determine the position of one of the planes, for example the negative plane 20, relative to the easel. No adjustment would be made, assuming that the negative plane is initially generally horizontal, although not necessarily perfectly parallel with the easel. In fact, for the purpose of this discussion, it will be assumed that the position of plane 20 causes the concentric circle around opening 38 to appear skewed, as in FIG. 2B. The next step is to adjust the other plane 24, for example the lens plane, so that it is parallel to the negative plane. This may be accomplished by utilizing the two mirror members and adjusting the position of the lens plane so that the concentric circle takes the same skewed configuration as the negative plane, that is, the skewed position illustrated in FIG. 2B. Once this is done, it can be assumed that the two planes 20 and 24 are, indeed, parallel to one another. Now it is only necessary to make sure that easel surface 18 is parallel with both the negative and lens planes. This can be accomplished by utilizing easel alignment assembly 64 is conjunction with the two mirror members in the manner described previously. Specifically, the operator may view through the top mirror member 28 at either negative plane 20 or lens plane 24 while adjusting the alignment bars 66 until the concentric circles appear in the mirror, as is illustrated in FIG. 2A. The easel is now parallel with the negative plane and the lens plane.

Figure 10:
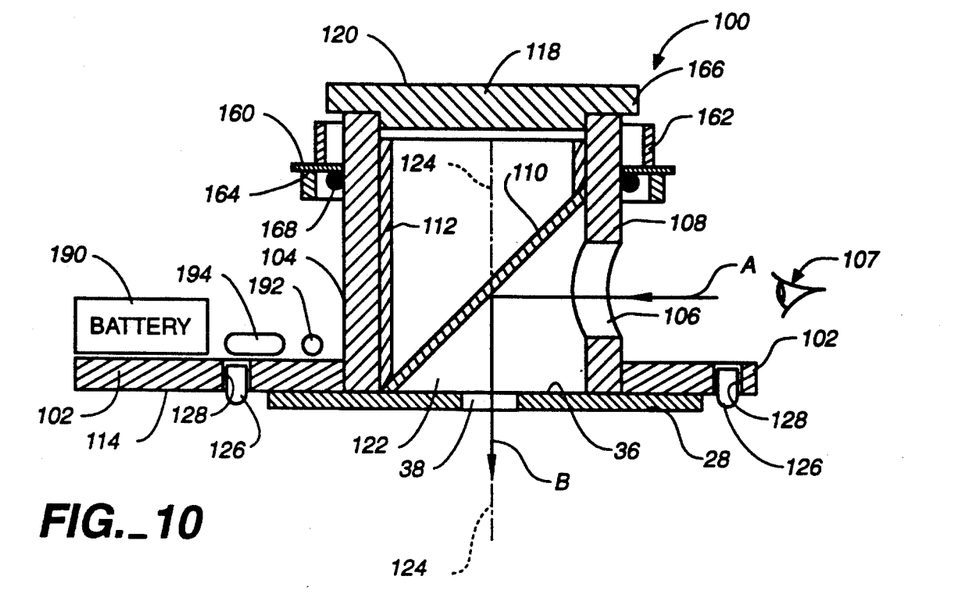
FIG. 10 schematically illustrates in cross section a view of an alignment module of the present invention.

Another embodiment of the present invention is illustrated in FIG. 10. Here mirror member 28, a flat plate, is incorporated into an alignment module 100. The alignment module 100 includes an assembly member 102 and a cylindrical member 104 having an aperture 106 in a cylinder wall 108. A mirror 110 (which may be referred to as a folding mirror) is attached to a mirror support 112 which, in turn, is bonded inside a cylindrical member 104. Mirror 110 is positioned adjacent aperture 106 so that it may be seen by a viewer 107 viewing in the direction of arrow A. Mirror 28 is attached to surface 114 of assembly member 102. One end of cylindrical member 104, having an opening 122 therein, is inserted through an aperture 116 in assembly member 102 and bonded to mirror member 28. A disc 118, having a flat surface 120, is bonded to the other end of cylindrical member 104 such that flat outer surface 120 is outermost and substantially parallel to mirrored surface 36 of mirror member 28.

Mirror member 28 has a viewing axis 124 lying in the direction of the arrow B. The viewing axis 124 is normal (perpendicular) to mirrored surface 26 and may extend through view-hole 38 (see FIG. 1) and an opening 122 in cylindrical member 104. View-hole 38 is preferably centered on viewing axis 124. Folding mirror 110 is thus located on viewing axis 124. The combination of aperture 106, folding mirror 110 and view-hole 38 provides viewing means for viewer 107 to view along viewing axis 124 by viewing in the direction of arrow A at an angle to viewing axis 124. Typically folding mirror 110 is inclined at about an angle of 45 degrees to viewing axis 124, such that the direction of arrow A is perpendicular to viewing axis 124.

Figure 11:
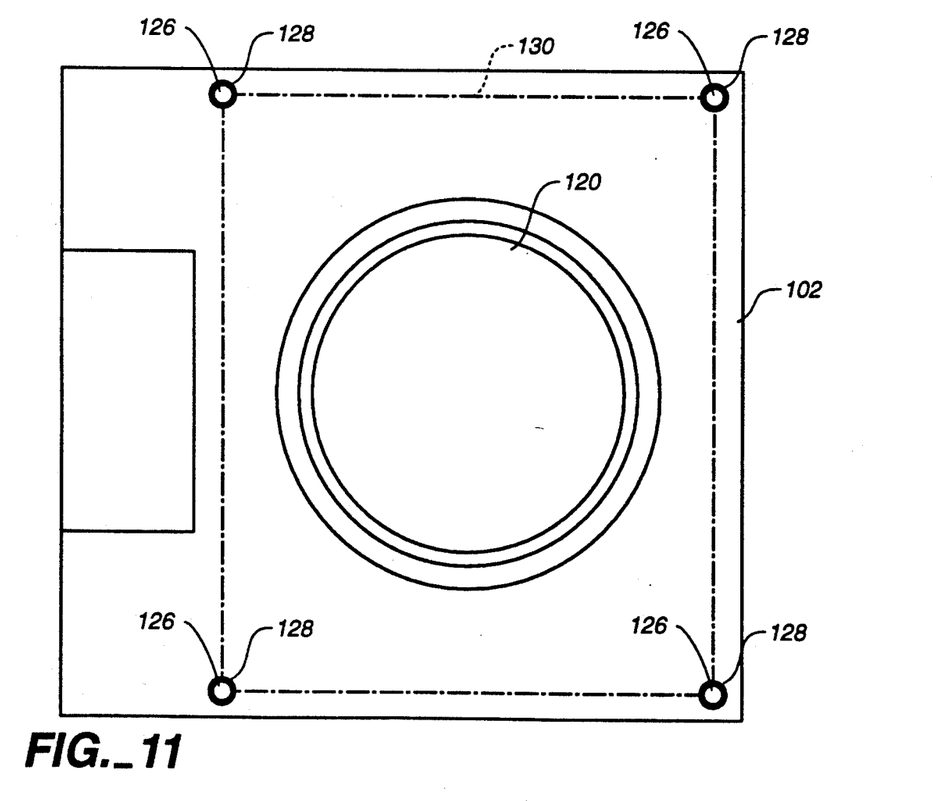
FIG. 11 schematically illustrates a top view of the alignment module of FIG. 10 showing the position of the luminous indicia.

Assembly member 102 includes a plurality of luminous indicia 126 (see FIG. 11) disposed about the perimeter of mirror member 28. The indicia are mounted in recesses 128 in assembly member 102. The luminous indicia are preferably light-emitting diodes (LEDs). Luminous indicia may also include incandescent light sources and self-luminous indicia including phosphorescent material. Preferably four indicia are provided. The four indicia may be preferably located at the corners of a rectangle and may be best located at the corners of a square as illustrated in FIG. 11 wherein the square is shown symbolically by broken lines 130. The indicia are preferably symmetrically disposed about viewing axis 124. The indicia are preferably located in a plane parallel to or co-planar with the plane of mirrored surface 36.

Figure 12:
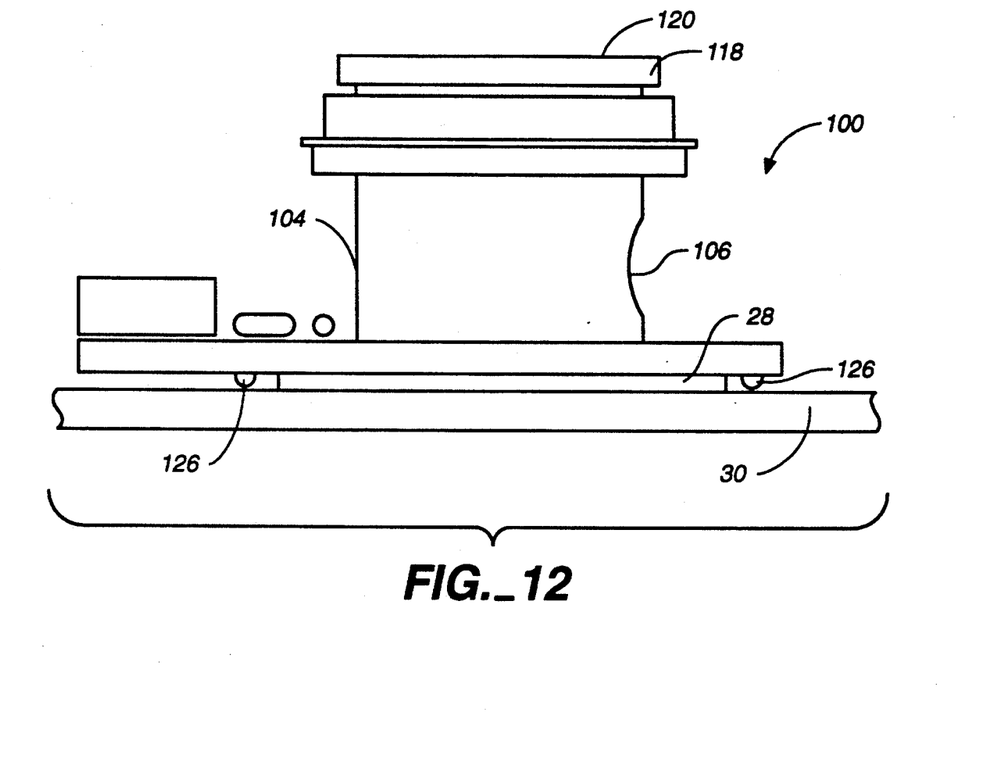
FIG. 12 schematically illustrates the alignment module of FIG. 10 supported by a glass plate.

Alignment module 100 may be used with photographic enlarger apparatus 10 (FIG. 1). Alignment module 100 may be mounted on enlarger apparatus 10 such that mirror member 28 is supported by plate 30 in the negative plane, or by plate 32 in the lens plane. This mounting method for alignment module 100 is illustrated in detail in FIG. 12. The mirrored surface of a second mirror (such as mirrored surface 34 of mirror member 26 in FIG. 1) may be simultaneously viewed along viewing axis 124 as described above. In this instance, folding mirror 110 serves a similar purpose to prism 52 in FIG. 1. Mirror member 26 is preferably no smaller than mirror member 28.

Figure 13:
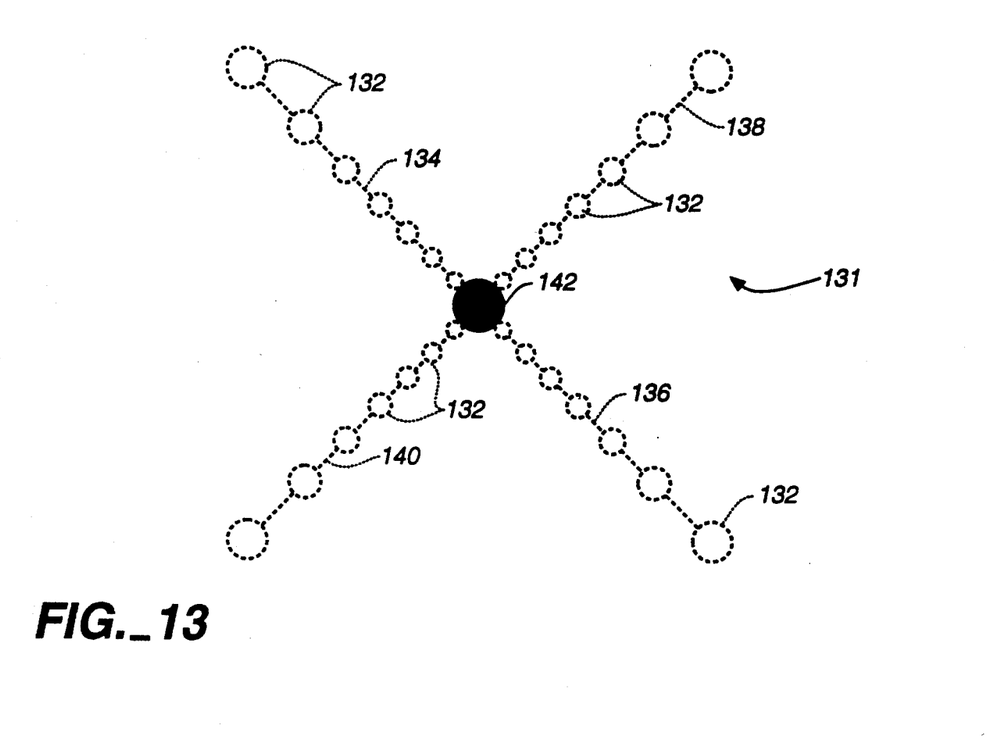
FIG. 13 schematically illustrates a pattern of images of the luminous indicia produced by an alignment module of the present invention when mirrored surfaces in two parallel planes are simultaneously viewed.
Figure 14:
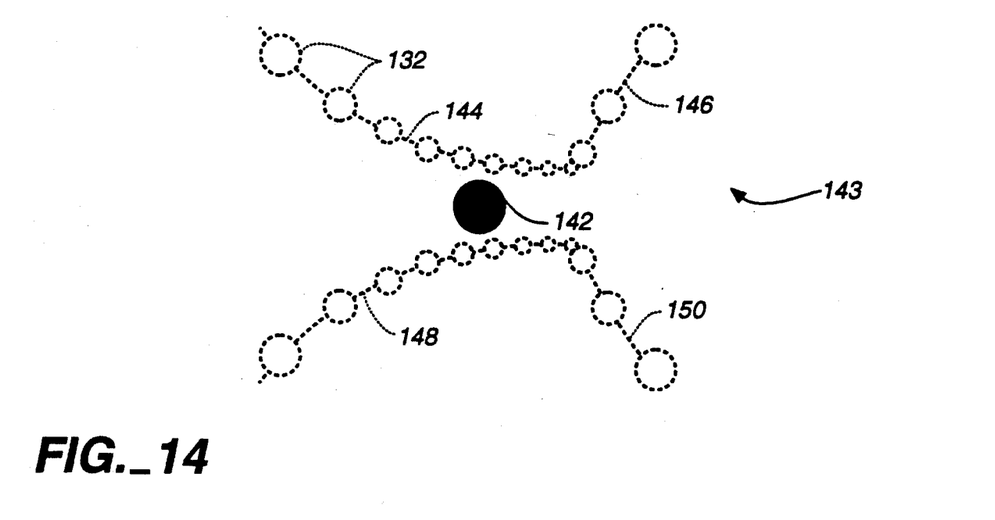
FIG. 14 schematically illustrates a pattern of images of the luminous indicia produced by an alignment module of the present invention when mirrored surfaces in two non-parallel planes are simultaneously viewed.

When mirrored surfaces 34 and 36 are simultaneously viewed a plurality of images of luminous indicia 126 will be visible to viewer 107. Referring now to FIGS. 13 and 14, patterns are shown of the images of four indicia 126 disposed at the corners of square 130 and distributed about viewing axis 124 as illustrated in FIG. 11.

FIG. 13 illustrates a pattern 131 visible when mirrored surfaces 34 and 36 are parallel. Images 132 of indicia 126 will lie along lines 134, 136, 138, and 140. The lines converge on dot 142 which is caused by viewhole 38. Outermost images are brightest. Images become successively smaller and dimmer as they converge on dot 142. When indicia 126 are arranged at the corners of a square symmetrical about view axis 124 and co-planar with or in a plane parallel to mirrored surface 36, lines 138 and 140 will be co-linear and lines 134 and 136 will be co-linear. Thus the pattern may comprise a plurality of images 132 of the indicia 126 lying on two substantially straight intersecting lines. The lines appear to intersect at the center of dot 142.

FIG. 14 illustrates a pattern 143 which may be observed when mirrored surfaces 34 and 36 are not parallel. Images 132 now lie on four curved lines 144, 146, 148, and 150. The lines do not converge on dot 142 and converge on no single point. Many different forms more or less similar to image pattern 143 may be observed, depending on the degree to which mirrored surfaces 34 and 36 are not parallel.

An alignment arrangement including four luminous indicia has been described above. However, any number of indicia may be provided. Each arrangement would provide only one pattern when mirrored surfaces 34 and 36 are parallel and many different patterns when the mirrored surfaces are not parallel. A single indicia, for example may provide, when mirrored surfaces 34 and 36 are parallel, a pattern including a single straight line of images of the indicia leading to the center of dot 142.

Referring again to FIG. 10, (see also FIG. 17) it can be seen that alignment module 100 includes a retaining ring 160 movably positioned around cylindrical member 104. Retaining ring 160 includes a portion 162 having threads on the outer surface thereof and a flange 164 which may make contact with an extended rim 166 of disc 120. Movement of retaining ring 160 on cylindrical member 104 is limited by a rubber ring 168 tightly fitted thereto.

Figure 15:
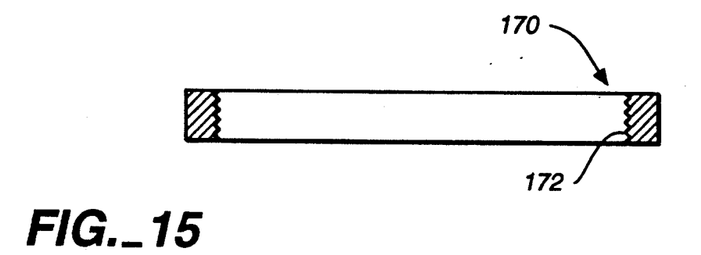
FIG. 15 schematically illustrates an adaptor ring for mounting the alignment module of FIG. 10 on a glass plate.

Mounting means for mounting the alignment module on enlarger apparatus 10 may include retaining ring 160 and adapters attached to plates 30 and 32. FIG. 15 illustrates a simple adaptor ring 170. The ring 170 has a threaded portion 172 on the inside surface thereof. Threaded portion 172 mates with threaded portion 162 of retaining ring 160.

Figure 17:
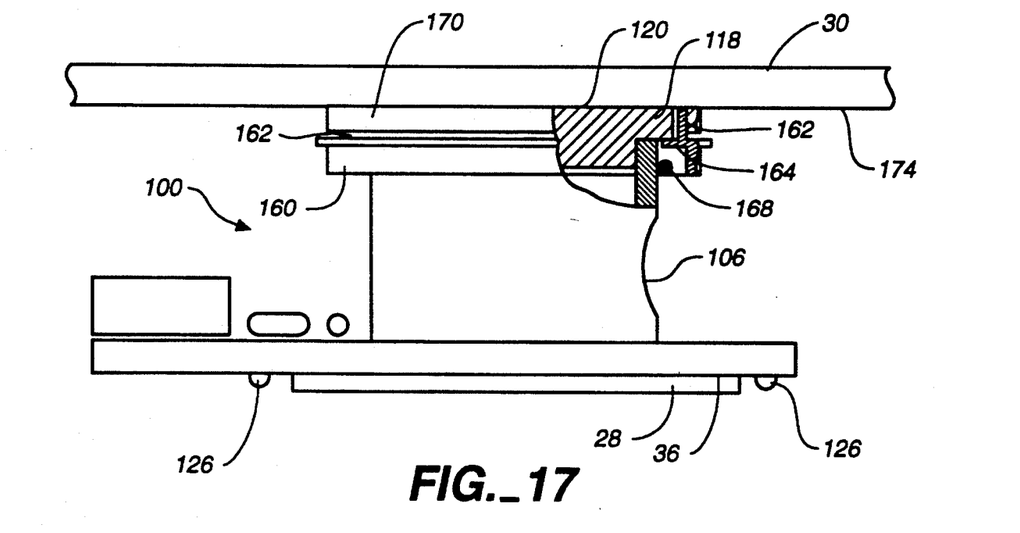
FIG. 17 schematically illustrates the alignment module of FIG. 10 suspended below a glass plate using the adaptor ring of FIG. 15.

FIG. 17 illustrates adaptor ring 170 bonded to a surface 174 of plate 30. Retaining ring 160 is screwed into adaptor ring 170 such that top surface 120 (not shown) of disc 118 (not shown) is located against surface 174 of plate 30. Alignment module 100 is thus attached to plate 30 with mirrored surface 36 of mirror member 28 substantially parallel to surface 174 of plate 30. The alignment module will remain attached independent of the orientation of plate 30, and thus, it stays properly positioned regardless of orientation of enlarger head 12 (FIGURE 1).

Figure 16:
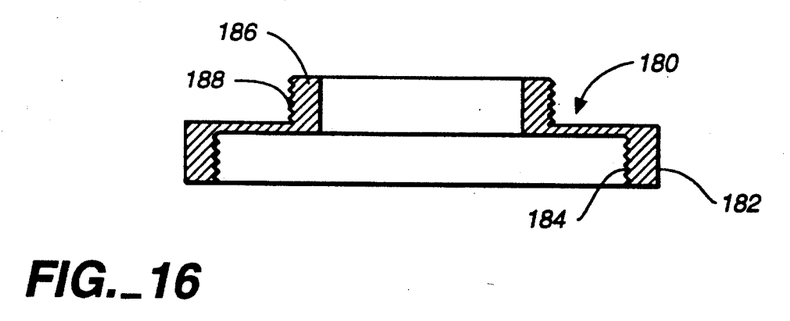
FIG. 16 schematically illustrates an adaptor ring for mounting the alignment module of FIG. 10 on a lens or a lens mount.

Other types of adaptor ring may be used in conjunction with retaining ring 160. FIG. 16 illustrates an example of a lens adaptor ring for mounting alignment module 100 directly to a lens or directly to a lens mount. Adaptor ring 180 has a portion 182 having threads 184 on the inner surface thereof. Threaded portion 184 mates with threaded portion 162 of retaining ring 160. A narrower portion 186 has threads 188 on the outer surface thereof. The diameter of portion 186 threads 188 may be chosen such that the adaptor ring 180 may be screwed into a lens or screwed into a lens mount in place of a lens.

Referring again to FIG. 10, alignment module 100 may include a power supply for luminous indicia 126. Power supply components may include a battery 190, a ballast resistor 192 and a switch 194. Assembly member 102 may include printed circuit means (not shown) for interconnecting the power supply components.

Embodiments of the present invention have been described in terms of their usefulness in aligning the negative plane, the lens plane and the easel of a photographic enlarger apparatus. A photographic enlarger apparatus however is only one example of photographic reproduction apparatus which would benefit from precise alignment. Examples of other equipment include apparatus for making a photographic copy or reproduction of a document, a photograph or a graphic work, a small or medium format camera in which the lens plane and the negative plane thereof are fixedly parallel to each other, or a technical camera or plate camera in which the negative plane, the lens plane and the plane of the object being reproduced may be independently aligned.

In general photographic reproduction apparatus may be described as including three principal planes. The three principal planes may be described as the object plane, the lens plane and the image plane. In a copying apparatus, the object being copied lies in the object plane and the photographic recording material lies in the image plane. In the example of enlarger 10 (see FIG. 1), a negative (or diapositive) being reproduced lies in negative plane 20. Thus negative plane 20 corresponds to the object plane. The image on the negative is re-imaged on photographic recording material (photographic paper) placed on surface 18 of easel 16, thus the easel plane corresponds to the image plane. In photographic reproduction apparatus, an alignment module, such as alignment module 100, including viewing means and luminous indicia, may be placed in any one of the principal planes of the photographic reproduction apparatus so any of the other principal planes may be aligned therewith.

While the present invention has been described in terms of placing mirrored surfaces 34 and/or 36 in one of the principal planes of a photographic reproduction apparatus, it will be evident to one skilled in the art that the mirrored surfaces need only be mounted parallel to the appropriate principal plane. Further, view-hole 38 has been described as an aperture extending completely through mirror member 28. It will be evident to one familiar with the art that if mirror member 28 is made from a transparent material, the view-hole may simply be an aperture in mirrored surface 36. Thus, a physical aperture extending completely through mirror member 36 would not be necessary.

Figure 18:
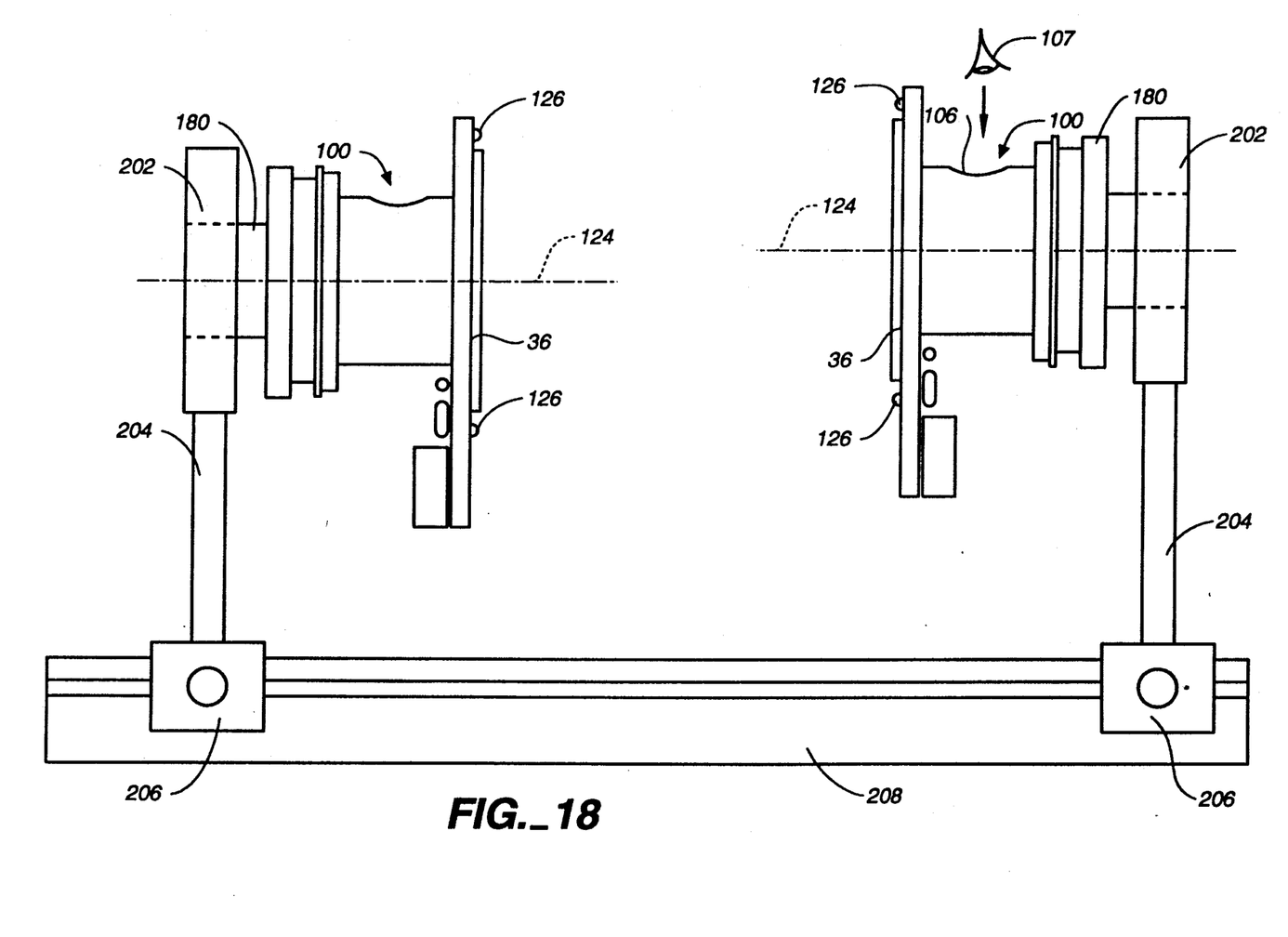
FIG. 18 schematically illustrates a coaxial alignment arrangement including two alignment modules of FIG. 10 mounted on an optical bench.

In yet another embodiment of the present invention, alignment modules such as alignment module 100 may be used to coaxially align two or more optical elements such as mirrors or lenses. This embodiment is illustrated in FIG. 18. Here alignment modules 100 are mounted using lens adaptor rings 180 into optical element mounts 202 in place of the optical elements (not shown) to be aligned. Alignment modules 100 are mounted such that the viewing axes 124 thereof have the same position and orientation as would the optic axes of the optical elements to be aligned. Optical element mounts 202 may be supported on posts 204 and clamps 206 on an optical bench 208. Optical element mounts 202 are provided with means (not shown) for adjustment which permit vertical and horizontal translation and angular adjustment of axes 124.

Figure 19:
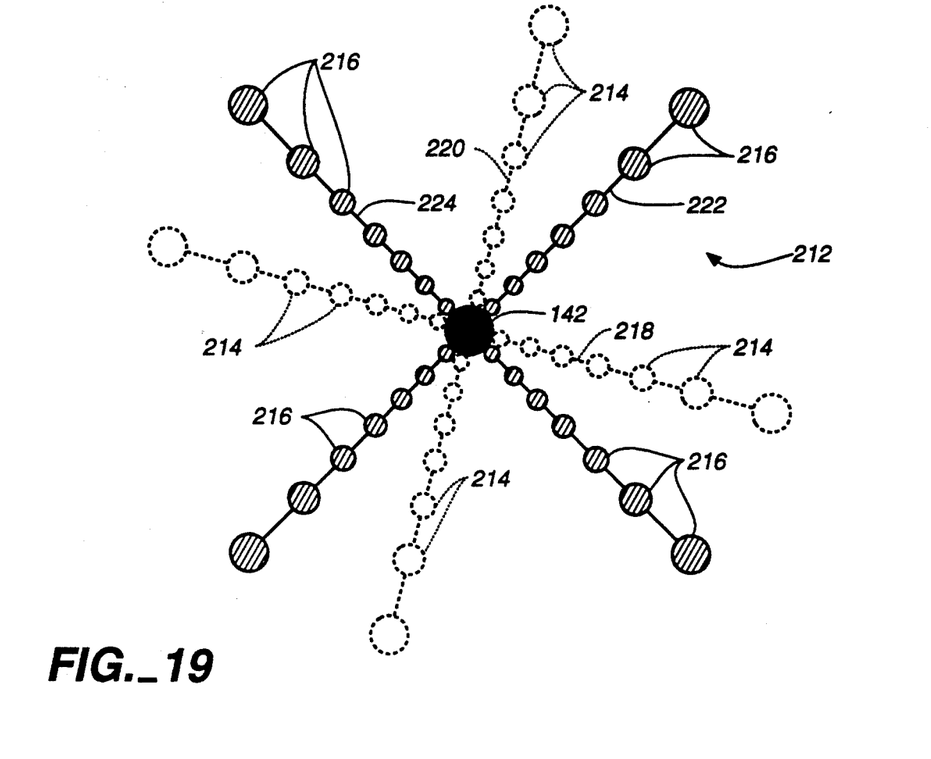
FIG. 19 schematically illustrates a pattern of images of the luminous indicia produced by the alignment modules of FIG. 18 when the two alignment modules are coaxially aligned.

When alignment modules 100 are made coaxial, a viewer 107 simultaneously viewing mirrored surfaces 36 through aperture 106 of either of the modules may observe a pattern such as the pattern 212 illustrated in FIG. 19. Pattern 212 represents the pattern which would appear if each of the modules 100 included four coplanar luminous indicia disposed at the corners of a square and symmetrical about axes 124. The pattern 212 is characteristic of the pattern which would appear if the indicia in each module were not in the same rotational position about axis 124. The pattern 212 comprises a plurality of images 214 of luminous indicia 126 from one of the alignment modules 100 and a plurality of images 216 of luminous indicia 126 from the other alignment module 100. The images 214 lie along two straight lines 218 and 220. The images 216 lie along two straight lines 222 and 224. The lines 218, 220, 222, and 224 appear to intersect at a common point at the center of dot 142. If the indicia in each module were in rotational alignment about axes 124 only two lines of images would appear.

Once modules 100 have been coaxially aligned by adjusting optical element mounts 202 modules 100 may be removed. The optical elements to be aligned will be coaxially aligned when placed in mounts 202.

As in other embodiments described above, the exact pattern which represents the required alignment condition will be determined by the spatial arrangement of the luminous indicia. For any given arrangement however there will be only one pattern which represents the desired alignment condition. Many other different patterns will appear to a viewer when the desired alignment condition is not satisfied.

The embodiment of FIG. 18 has been described in terms of using two alignment modules 100, each module including viewing means, a mirror member, and luminous indicia. Other configurations are possible. For example, it may be possible to observe a pattern, such as pattern 212, if only one module includes viewing means. It may also be advantageous if luminous indicia in one module have a different color from the indicia in the other module. Image patterns due to each module would appear in different colors. This may make it easier to identify the effects of adjusting the individual modules.

Figure 20:
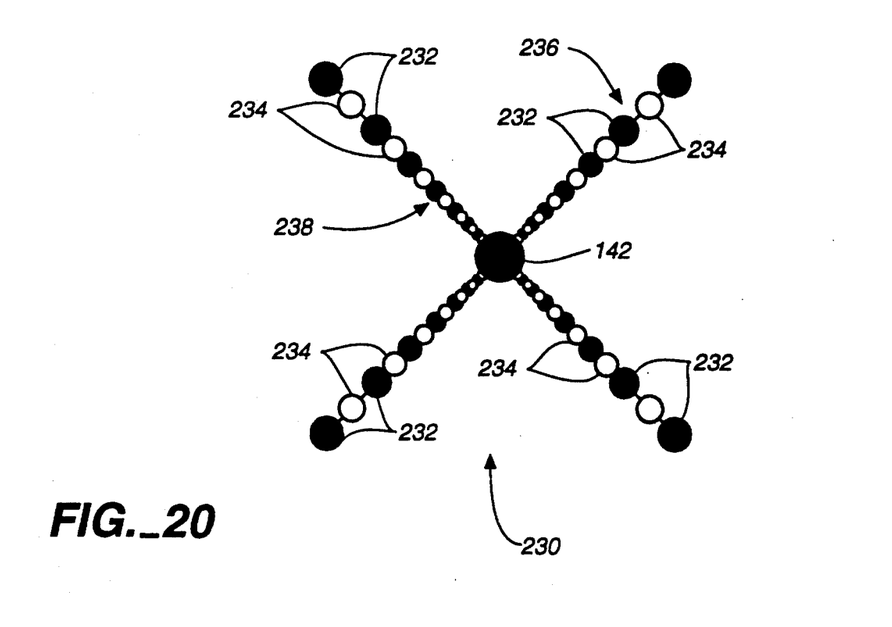
FIG. 20 schematically illustrates a pattern of images of the luminous indicia produced by the alignment modules of FIG. 18 when the two alignment modules are coaxially and rotationally aligned.

FIG. 20 shows a pattern, designated by the general numeral 230, which would be observed when two modules 100, as shown in FIG. 18, are rotationally and coaxially aligned, and diodes 126 have the same spacing about axes 124. Diodes in one of the modules 100 may have one color, for example red, and diodes in the other module may have another color, for example, green. Images 232 of diodes of one color and images 234 of diodes of the other color are aligned on two lines 236 and 238 which appear to intersect in the center of dot. Images 232 and 234, having different colors, appear alternately on lines 236 and 238, as the adjacent images result from different multiple reflections between modules 100.

The present invention has been described in detail in terms of a number of embodiments. The present invention is not limited however to the embodiments described. Rather, the invention is defined by the appended claims.

What is claimed is:

1. An alignment arrangement for use with photographic reproduction apparatus including a lens defining a lens plane, means for supporting an object to be reproduced defining an object plane and means for supporting photographic recording material defining an image plane, said planes being collectively defined as principal planes of said photographic reproduction apparatus, and said alignment arrangement comprising:

means including a first mirror member having a mirror body including a mirrored surface and a viewhole through said mirrored surface, said means configured to place said first mirror member parallel to one of said principal planes;

a second mirror member having a mirror body including a mirrored surface, said second mirror member being configured to lie parallel to another of said principal planes such that its mirrored surface faces the mirrored surface of said first mirror member;

viewing means for allowing a viewer to simultaneously view both of said mirrored surfaces from a direction at an angle to a viewing axis substantially perpendicular to said mirrored surfaces; and at least one luminous indicia disposed relative to said principal planes such that a plurality of images of said luminous indicia is visible when said mirrored surfaces are simultaneously viewed, whereby said images of said luminous indicia appear to a viewer as only one of many different patterns when said mirrored surfaces are parallel.

2. The alignment arrangement of claim 1 including four luminous indicia.

3. The alignment arrangement of claim 2 wherein said luminous indicia are light-emitting 4. The alignment arrangement of claim 1 wherein said viewing means includes a mirror.

5. The alignment arrangement of claim 4 wherein said mirror is inclined at an angle of about 45 degrees to said viewing axis.

6. The alignment arrangement of claim 1 wherein said photographic reproduction apparatus is a photographic enlarger.

7. An alignment arrangement for use with photographic reproduction apparatus including a lens defining a lens plane, means for supporting an object to be reproduced defining an object plane and means for supporting photographic recording material defining an image plane, said planes being collectively defined as principal planes of said photographic reproduction apparatus, and said alignment arrangement comprising:

an alignment module including a first mirror member having a mirror body including a mirrored surface and a view-hole through said mirrored surface and at least one luminous indicia, said alignment module being configured to place said first mirror member parallel to one of said principal planes;

a second mirror member having a mirror body including a mirrored surface, said second mirror member being configured to lie parallel to another of said principal planes such that its mirrored surface faces the mirrored surface of said first mirror member;

viewing means included in said alignment module for allowing a viewer to simultaneously view both of said mirrored surfaces from a direction at an angle to a viewing axis substantially perpendicular to said mirrored surfaces; and said luminous indicia being disposed relative to said first mirror member such that a plurality of images of said luminous indicia is visible when said mirrored surfaces are simultaneously viewed, whereby said images of said luminous indicia appear to a viewer as only one of many different patterns when said mirrored surfaces are parallel.

8. The alignment arrangement of claim 7 wherein said viewing means includes a mirror.

9. The alignment arrangement of claim 7 further including a power supply for said luminous indicia.

10. The alignment arrangement of claim 9 wherein said luminous indicia are light-emitting diodes.

11. The alignment arrangement of claim 10 wherein said power supply is included in said alignment module.

12. An alignment arrangement for use with photographic reproduction apparatus including a lens defining a lens plane, means for supporting an object to be reproduced defining an object plane and means for supporting photographic recording material defining an image plane, said planes being collectively defined as principal planes of said photographic reproduction apparatus, and said alignment arrangement comprising:

an alignment module including a first mirror member having a mirror body including a mirrored surface and a view-hole through said mirrored surface, and four luminous indicia disposed about the perimeter of said first mirror member substantially at the corners of a rectangle, and said alignment module being configured to place said first mirror member parallel to one of said principal planes;

a second mirror member having a mirror body including a mirrored surface, said second mirror member being configured to lie parallel to another of said principal planes such that its mirrored surface faces the mirrored surface of said first mirror member;

viewing means including a mirror incorporated in said alignment module for allowing a viewer to simultaneously view both of said mirrored surfaces from a direction at an angle to a viewing axis substantially perpendicular to said mirrored surfaces; and said luminous indicia appearing to a viewer as a plurality of images of said luminous indicia when said mirrored surfaces are simultaneously viewed, and when said mirrored surfaces are parallel said images of said luminous indicia appear to lie along two substantially straight lines and said lines appear to intersect at the center of a dot.

13. The alignment arrangement of claim 12 wherein said luminous indicia are light-emitting diodes.

14. The alignment arrangement of claim 12 wherein said alignment module includes a power supply for said light-emitting diodes.

15. The alignment arrangement of claim 14 wherein aid alignment module includes mounting means for mounting said alignment module on said photographic reproduction apparatus.

16. The alignment arrangement of claim 15 wherein said mounting means further includes adaptor means for attaching said alignment module to a lens.

17. The alignment arrangement of claim 15 wherein said mounting means further includes adaptor means for attaching said alignment module to a lens mount.

18. An alignment module for photographic reproduction apparatus, comprising:

a mirror member having a mirror body including a mirrored surface, a view-hole through said mirrored surface, and a viewing axis defined by a normal to said mirrored surface and extending through said view-hole;

viewing means including a folding mirror for allowing a viewer to view along said viewing axis from a position at an angle thereto; and at least one luminous indicia disposed at about the perimeter of said mirror member.

19. The alignment module of claim 18 wherein said folding mirror is located on said viewing axis and inclined at about 45 degrees thereto.

20. The alignment module of claim 18 wherein said luminous indicia are light-emitting diodes.

21. The alignment module of claim 18 wherein said luminous indicia are co-planar.

22. The alignment module of claim 21 wherein said luminous indicia are disposed symmetrically about said viewing axis.

23. An alignment module for photographic recording apparatus, comprising:

a mirror member having a mirror body including a mirrored surface, a view-hole through said mirrored surface, and having a viewing axis defined by a normal to said mirrored surface extending through said view-hole;

an assembly member having at least one aperture, said mirror member being joined to said assembly member such that said view hole and said at least one aperture are substantially aligned;

a cylindrical member having an opening at one end thereof, a flat surface at the other end thereof and a viewing aperture in a wall thereof, said one end of said cylindrical member extending into said aperture in said assembly member and said cylindrical member being joined at said one end to said mirror member such that said mirrored surface and said flat are substantially parallel;

a folding mirror mounted in said cylindrical member said folding mirror being positioned adjacent said viewing aperture, on said viewing axis and inclined thereto such that a viewer viewing through said viewing aperture may view through said view-hole along said viewing axis; and four luminous indicia disposed in a plane substantially parallel to said mirrored surface, said luminous indicia being coplanar and located at the corners of a rectangle and symmetrically disposed about said viewing axis.

24. The alignment module of claim 23 wherein said luminous indicia are light-emitting diodes and said light-emitting diodes are mounted on said assembly member.

25. The alignment module of claim 24 further including a power supply for said light-emitting diodes.

26. The alignment module of claim 25 wherein said assembly member includes a printed circuit board.

27. The alignment arrangement of claim 26 further including mounting means for removably attaching said alignment module on the photographic reproduction apparatus 28. In a photographic reproduction apparatus including a lens defining a lens plane, means for supporting the object to be reproduced defining an object plane and means for supporting photographic recording material defining an image plane, said planes being collectively defined as principal planes of said photographic reproduction apparatus, a method of aligning said lens plane with another plane facing said lens plane, said method comprising the steps of:
   providing a first mirror member having a mirror body including a mirrored surface and a view-hole through said mirrored surface, and placing said first mirror member parallel to one of said principal planes;
   providing a second mirror member having a mirror body including a mirrored surface, and placing said second mirror member parallel to another of said principal planes such that its mirrored surface faces the mirrored surface of said first mirror member
   providing viewing means for allowing a viewer to simultaneously view both of said mirrored surfaces from a direction at an angle to a viewing axis substantially perpendicular to said mirrored surfaces
   providing at least one luminous indicia positioned relative to said mirrored surfaces such that a plurality of images of said luminous indicia are visible when said mirrored surface are simultaneously viewed, said plurality of images of said luminous indicia taking on only one of many different forms when said mirrored surface are parallel;
   while simultaneously viewing said mirrored surfaces along said viewing axis, adjusting the position of said one principal plane and/or said another principal plane until said plurality of images of said luminous indicia takes on said one of many different forms.

29. The method of claim 28 wherein said photographic reproduction apparatus is a photographic enlarger.

30. The method of claim 28 including four luminous indicia located at the corners of a rectangle and symmetrically disposed about said viewing axis.

31. The method of claim 30 wherein said one of many different forms includes said plurality of images of said luminous indicia appearing to lie along two straight lines, said straight lines appearing to intersect at the center of a dot.

32. The method of claim 31 wherein said first mirror member, said viewing means and said luminous indicia are incorporated in an alignment module.

33. A method for aligning at least first ad second optical elements each having an optic axis, said optical elements being supported respectively on a first and second optical element mounts, said optical element mounts being adjustable in position and inclination, said method comprising:
   providing a first mirror member having a mirror body including a mirrored surface, a view-hole through said mirrored surface, and a first viewing axis normal to said mirrored surface extending through said view-hole;
   providing a removable mounting for said first mirror member o the first optical element mount such that said first viewing axis corresponds in position and inclination with the optic axis of the first optical element;
   providing a second mirror member having a mirror body including a mirrored surface and a second viewing axis normal to said mirrored surface;
   providing a removable mounting for said second mirror member on the second optical element mount such that said second viewing axis corresponds in position and inclination with the optic axis of the second optical element;
   providing viewing means for allowing a viewer to simultaneously view both of said mirrored surfaces along said first viewing axis
   providing at least one luminous indicia attached to said first mirror member and at least one luminous indicia attached to said second mirror member, said luminous indicia being positioned such that a plurality of images thereof is visible when said mirrored surfaces are simultaneously viewed, said plurality of images of said luminous indicia taking on only one of many different forms when said first and second viewing axes are coaxial; and
   while viewing said mirrored surfaces along said viewing axis, adjusting the position of said first and/or second optical element mounts until said plurality of images of said luminous indicia takes on said one form, whereby said first and second viewing axes may be assumed to be coaxial and thus the first and second optical elements can be assumed to be coaxially aligned.

* * * * *

UNITED STATES PATENT AND TRADEMARK OFFICE
CERTIFICATE OF CORRECTION

PATENT NO. : 5,239,339
DATED : August 24, 1993
INVENTOR(S) : Ziegler

It is certified that error appears in the above-indentified patent and that said Letters Patent is hereby corrected as shown below:

Column 3, line 41: replace "assemble" by —assembly—.
Column 4, line 19: replace "12" by —10—.
Column 5, line 15: delete the ",".
Column 6, line 59: replace the second occurrence of "is" by —in—.
Column 9, line 19: replace "Will" by —will—.
Column 12, line 44: after "light-emitting" insert —diodes.—.
Column 13, line 62: replace "12" by —13—; line 66: replace "aid" by —said—.
Column 15, line 2: after "apparatus" insert a period; lines 31 and 34: replace "surface" by —surfaces—.
Column 16, line 18: replace "o" by —on—.

Signed and Sealed this

Fourteenth Day of June, 1994

Attest:

BRUCE LEHMAN

*Attesting Officer*        *Commissioner of Patents and Trademarks*